United States Patent
Dinkar et al.

(10) Patent No.: US 9,594,643 B2
(45) Date of Patent: Mar. 14, 2017

(54) HANDLING RESTORES IN AN INCREMENTAL BACKUP STORAGE SYSTEM

(71) Applicant: Quest Software Inc., Aliso Viejo, CA (US)

(72) Inventors: Abhijit Dinkar, San Jose, CA (US); Goutham Rao, Los Altos, CA (US); Vinod Jayaraman, San Francisco, CA (US); Shekhar Pardeshi, Fremont, CA (US)

(73) Assignee: Quest Software Inc., Aliso Viejo, CA (US)

( * ) Notice: Subject to any disclaimer, the term of this patent is extended or adjusted under 35 U.S.C. 154(b) by 277 days.

(21) Appl. No.: 13/786,781

(22) Filed: Mar. 6, 2013

(65) Prior Publication Data

US 2014/0258237 A1 Sep. 11, 2014

(51) Int. Cl.
*G06F 17/30* (2006.01)
*G06F 11/14* (2006.01)

(52) U.S. Cl.
CPC ...... *G06F 11/1469* (2013.01); *G06F 11/1451* (2013.01); *G06F 11/1453* (2013.01)

(58) Field of Classification Search
CPC ............. G06F 11/1469; G06F 11/1451; G06F 11/1453; G06F 17/30156; G06F 17/30159
See application file for complete search history.

(56) References Cited

U.S. PATENT DOCUMENTS

| 6,269,381 | B1 * | 7/2001 | St. Pierre et al. | |
|---|---|---|---|---|
| 6,665,815 | B1 * | 12/2003 | Goldstein et al. | 714/20 |
| 7,650,341 | B1 * | 1/2010 | Oratovsky | G06F 11/1435 707/999.01 |
| 7,725,438 | B1 * | 5/2010 | Shah et al. | 707/646 |
| 8,204,862 | B1 * | 6/2012 | Paulzagade | G06F 11/1469 707/679 |
| 8,335,768 | B1 * | 12/2012 | Desai | G06F 11/1448 707/674 |
| 8,745,003 | B1 * | 6/2014 | Patterson | G06F 17/00 707/639 |
| 8,874,524 | B1 * | 10/2014 | Zhao | G06F 17/30088 707/639 |

(Continued)

OTHER PUBLICATIONS

"Deduplication, Incremental Forever, and the Olsen Twins", White Paper, Unitrends, Retrieved from the Internet: <http://www.unitrends.com/docs/papers/white-papers/unitrends-wp-deduplication-and-the-olsen-twins.pdf>, Accessed on Dec. 29, 2013, Dec. 16, 2011, 9 pgs.

(Continued)

*Primary Examiner* — Shiow-Jy Fan
(74) *Attorney, Agent, or Firm* — Kwan & Olynick LLP

(57) ABSTRACT

Techniques and mechanisms are provided for storing data in a backup storage system. According to various embodiments, a first blockmap in a backup storage system may be identified. The first blockmap may correspond with a first restore point. The first blockmap may identify a first plurality of data segments. Each of the first plurality of data segments may have associated therewith a respective storage location in the backup storage system. The first blockmap may be compared with a designated storage system state to identify a subset of the first plurality of data segments that each correspond with a respective matching data segment in the designated storage system state. A second blockmap may be stored in the backup storage system. The second blockmap may correspond with a second restore point. The second blockmap may include the identified subset of the first plurality of data segments.

12 Claims, 6 Drawing Sheets

(56) References Cited

U.S. PATENT DOCUMENTS

| | | | |
|---|---|---|---|
| 8,954,398 B1* | 2/2015 | Zhang | G06F 17/30156 707/687 |
| 2010/0077165 A1* | 3/2010 | Lu et al. | 711/162 |
| 2010/0257142 A1* | 10/2010 | Murphy | G06F 11/1453 707/681 |
| 2010/0274765 A1* | 10/2010 | Murphy et al. | 707/652 |
| 2010/0312752 A1* | 12/2010 | Zeis et al. | 707/640 |
| 2011/0218966 A1* | 9/2011 | Barnes et al. | 707/645 |
| 2012/0030477 A1* | 2/2012 | Lu et al. | 713/189 |
| 2012/0143835 A1* | 6/2012 | Aronovich et al. | 707/696 |

OTHER PUBLICATIONS

DuBois, Laura et al., "Backup and Recovery: Accelerating Efficiency and Driving Down IT Costs Using Data Deduplication", White Paper, IDC, Retrieved from the Internet: <http://www.usicorp.com/Doc/USI%20White%20Papers/idc-20090519-data-deduplication.pdf (Feb. 1, 2010)>, Accessed on Dec. 29, 2013, Feb. 2010, 16 pgs.

Lillibridge, Mark et al., "Sparse Indexing: Large Scale, Inline Deduplication Using Sampling and Locality", HP Laboratories, Retrieved from the Internet: <http://www.hpl.hp.com/techreports/2009/HPL-2009-122.pdf>, Accessed on Dec. 29, 2013, Jun. 6, 2009, 14 pgs.

Yang, Tianming et al., "DEBAR: A Scalable High-Performance Deduplication Storage System for Backup and Archiving", CSE Technical Reports, University of Nebraska-Lincoln, Retrieved from the Internet: <http://digitalcommons.unl.edu/cgi/viewcontent.cgi?article=1059&context=csetechreports>, Accessed on Dec. 29, 2013, Jan. 5, 2009, 20 pgs.

* cited by examiner

HANDLING RESTORES IN AN INCREMENTAL BACKUP STORAGE SYSTEM

TECHNICAL FIELD

The present disclosure relates to restoring a backup of data configured in an incremental forever workflow storage arrangement.

DESCRIPTION OF RELATED ART

A backup storage system may store information that may be used to restore information in a primary storage system, for instance if the primary storage system is damaged or if data is inadvertently deleted. Backup storage systems typically operate by storing one or more restore points. Each restore point contains information necessary for restoring the primary storage system to the state it was in when the restore point was created. Various types of backup storage systems may be used to backup information stored on primary storage systems.

One type of configuration is a "full forever" backup storage system implementation. In a "full forever" arrangement, a restore point includes all of the information necessary to restore the data in its entirety. However, this type of configuration is neither space nor speed efficient during the backup process. For instance, in many systems the data may change only slightly between the creation of successive restore points. However, in a conventional "full forever" implementation, a complete copy of the data to be backed up is typically transferred to the backup storage system and stored there for each restore point, which involves a significant amount of redundant storage as well as a large amount of communication between the primary and backup storage systems.

Another type of storage system configuration is an "incremental" backup storage system implementation. In an incremental storage system, one restore point may store the difference or incremental change over another restore point. So, if a second restore point is created a week after a first restore point is created, the second restore point need only store the "delta" or difference between the state of the primary storage system when the first restore point was created and the state of the primary storage system when the second restore point was created. However, in order to restore a target restore point in an incremental backup storage system, earlier restore points must be read (also referred to as synthesized) to successfully use the delta or difference information stored in the target restore point.

Incremental backup storage system implementations may be of the "incremental forever" type or of the "incremental partial" type. In the incremental forever arrangement, all previous restore points are needed to restore the system. In the partial incremental type, some of the restore points are full or synthesized restore points that store a complete copy of the primary storage system data, so that not all of the previous restore points need to be synthesized in order to restore a target restore point.

BRIEF DESCRIPTION OF THE DRAWINGS

The disclosure may best be understood by reference to the following description taken in conjunction with the accompanying drawings, which illustrate particular embodiments of the present invention.

DESCRIPTION OF PARTICULAR EMBODIMENTS

Figure 1:
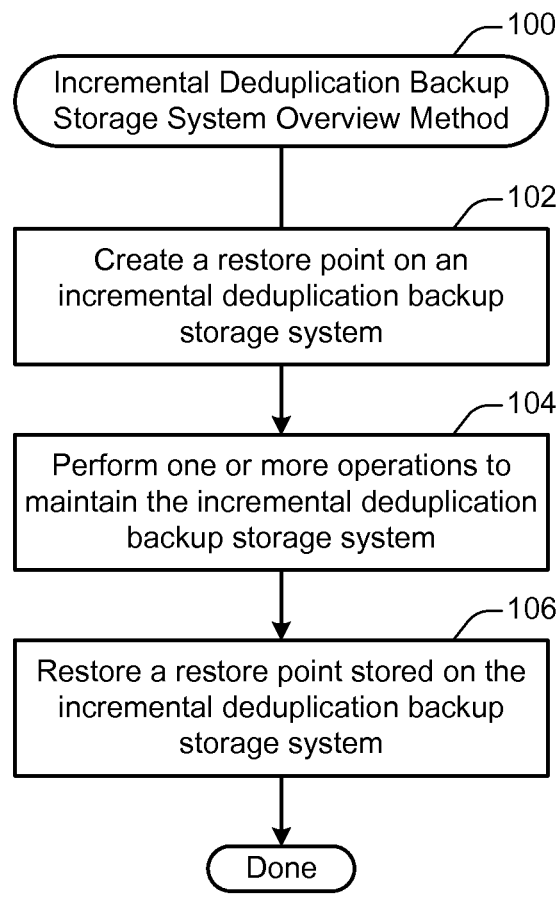
FIG. 1 illustrates a particular example of an overview method for an incremental deduplication backup storage system.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques and mechanisms of the present invention will be described in the context of particular data storage mechanisms. However, it should be noted that the techniques and mechanisms of the present invention apply to a variety of different data storage mechanisms. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Techniques and mechanisms are provided for maintaining an incremental forever workflow. According to various embodiments, when backing up data on a primary storage system to create a new restore point, the system may determine the closest existing restore point to the new restore point. Then, the new restore point may be created as a virtual restore point that acts as a thin clone of the closest existing restore point. The virtual restore point may include a blockmap that includes references to data segments stored on the backup storage system. The blockmap for the new restore point may be similar to that of the closest existing restore point but may include different references for data segments that differ between the two restore points. To restore the restore point, the location of the data segments included in the restore point may be read from the blockmap.

Example Embodiments

According to various embodiments, data may be backed up to a backup storage system configured for data deduplication. In computing, data deduplication is a specialized data compression technique for eliminating duplicate copies of repeating data. Deduplication techniques may be used to improve storage utilization or network data transfers by effectively reducing the number of bytes that must be sent or stored. In the deduplication process, unique chunks of data, or byte patterns, are identified and stored during a process of analysis. As the analysis continues, other chunks are compared to the stored copy and a redundant chunk may be replaced with a small reference that points to the stored chunk. Given that the same byte pattern may occur dozens, hundreds, or even thousands of times, the amount of data that must be stored or transferred can be greatly reduced. The match frequency may depend at least in part on the chunk size. A storage system may employ one or more fixed chunk sizes or may support variable chunk sizes.

According to various embodiments, deduplication differs from standard file compression techniques. While standard file compression techniques typically identify short repeated substrings inside individual files, storage-based data deduplication involves inspecting potentially large volumes of data and identify potentially large Sections—such as entire files or large sections of files—that are identical, in order to store only one copy of a duplicate section. In some instances, this copy may be additionally compressed by single-file compression techniques. For example, a typical email system might contain many instances of the same one megabyte (MB) file attachment. Each time the system is backed up, all 100 instances of the attachment are saved, requiring 100 MB storage space. With data deduplication, the storage space required may be limited to only one instance of the attachment. Subsequent instances may be referenced back to the saved copy, which results in a deduplication ratio of roughly 100 to 1.

According to various embodiments, each restore point in a deduplication backup storage system may include references to data segments stored on the backup storage. Reference counts for each data segment may be maintained so that a data segment is deleted only if no references point to it.

According to various embodiments, each restore point in a deduplication backup storage system may be thought of as incremental in the sense that the only new data that need be stored is data that is different than that associated with the closest existing restore point. Accordingly, the amount of backup storage space needed to back up a primary storage system is reduced relative to a conventional full forever backup storage system implementation because only the changed data need be stored for each restore point rather than a complete copy of the data. Similarly, the amount of data communication needed to create a restore point in a deduplication backup storage system is reduced relative to a full forever backup storage system implementation because only the changed data need be transmitted from the primary storage system to the backup storage system.

In particular embodiments, each restore point in a deduplication backup storage system may be thought as complete in the sense that a restore point includes references to each of the data segments included in the store point. Accordingly, in contrast to a conventional incremental forever backup storage system, a restore point in a deduplication backup storage system may be restored without reading or synthesizing other restore points stored in the deduplication backup system.

FIG. 1 illustrates a particular example of an overview method 100 for an incremental deduplication backup storage system. According to various embodiments, the method 100 may be performed at a computing device in communication with a primary storage system and a backup storage system. The method 100 may be used to back up the primary storage system to the backup storage system, perform one or more operations for maintaining the backup storage system, and restore a backup from the backup storage system to the primary storage system.

At 102, a restore point is created on an incremental deduplication backup storage system. According to various embodiments, creating a restore point on an incremental deduplication backup storage system may involve identifying an existing restore point that is similar to the new restore point. Then, the blockmap associated with the existing restore point may be cloned or copied to the extent that it refers to the same data segments. Finally, data segments that have changed between the two restore points may be stored, and the cloned blockmap may be updated to include references to these changed data segments.

At 104, one or more operations to maintain the incremental deduplication backup storage system are performed. According to various embodiments, maintaining the incremental deduplication backup storage system may involve performing various operations such as defragmenting and/or deduplicating the backup storage system.

In particular embodiments, older restore points may be deleted over time. However, newer restore points may still include references to data segments originally stored in conjunction with these older restore points. Accordingly, data segments associated with older restore points that have been deleted may be defragmented. Defragmenting may involve, for instance, moving these data segments to more contiguous locations within the storage system. Alternately, or additionally, data segments associated with older, deleted restore points may be used to synthesize or combine newer restore points to create more contiguous arrangements of data segments.

At 106, a restore point stored on the incremental deduplication backup storage system is restored. According to various embodiments, the restore point may be restored by retrieving the blockmap associated with the restore point. Then, the data segments associated with the restore point may be retrieved by following the references included in the blockmap. Techniques for restoring a restore point from an incremental deduplication backup storage system are discussed in further detail with respect to FIG. 5.

According to various embodiments, the operations shown in FIG. 1 need not be performed in the order presented in method 100. For example, operations to maintain the backup storage system may be performed at any time and need not be performed in the interval between creating a particular restore point and restoring the restore point. As another example, many different restore points may be created before restoring any particular restore point.

Figure 2:
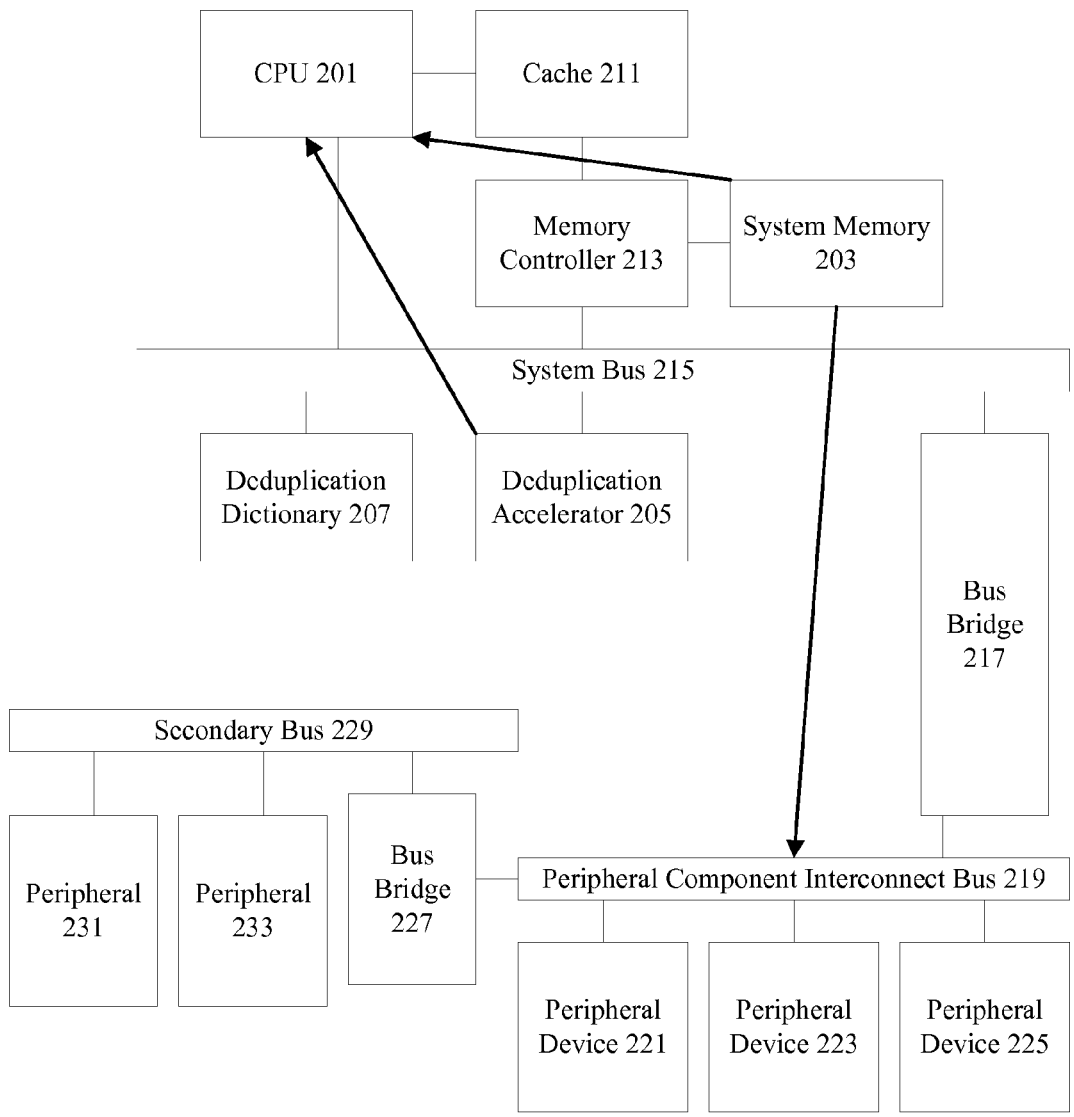
FIG. 2 illustrates a particular example of a system that can use the techniques and mechanisms of the present invention.

FIG. 2 illustrates a particular example of a system that can be used in conjunction with the techniques and mechanisms of the present invention. According to various embodiments, data is received at an accelerated deduplication system 200 over an interface such as a network interface. A data stream may be received in segments or blocks and maintained in system memory 203. According to various embodiments, a processor or CPU 201 maintains a state machine but offloads boundary detection and fingerprinting to a deduplication engine or deduplication accelerator 205. The CPU 201 is associated with cache 211 and memory controller 213. According to various embodiments, cache 211 and memory controller 213 may be integrated onto the CPU 201.

In particular embodiments, the deduplication engine or deduplication accelerator 205 is connected to the CPU 201 over a system bus 215 and detects boundaries using an algorithm such as Rabin to delineate segments of data in system memory 203 and generates fingerprints using algorithms such as hashing algorithms like SHA-1 or MD-5. The deduplication engine 205 accesses the deduplication dictionary 207 to determine if a fingerprint is already included in the deduplication dictionary 207. According to various embodiments, the deduplication dictionary 207 is maintained in persistent storage and maps segment fingerprints to segment storage locations. In particular embodiments, segment storage locations are maintained in fixed size extents. Data store suitcases, references, metadata, etc., may be created or modified based on the result of the dictionary lookup.

If the data needs to be transferred to persistent storage, the optimization software stack will communicate to the CPU 201 the final destination direct memory access (DMA) addresses for the data. The DMA addresses can then be used to transfer the data through one or more bus bridges 217 and/or 227 and secondary buses 219 and/or 229. An example of a secondary bus is a peripheral component interconnect (PCI) bus 219. Peripherals 221, 223, 225, 231, and 233 may be peripheral components and/or peripheral interfaces such as disk arrays, network interfaces, serial interfaces, timers, tape devices, etc.

Figure 3:
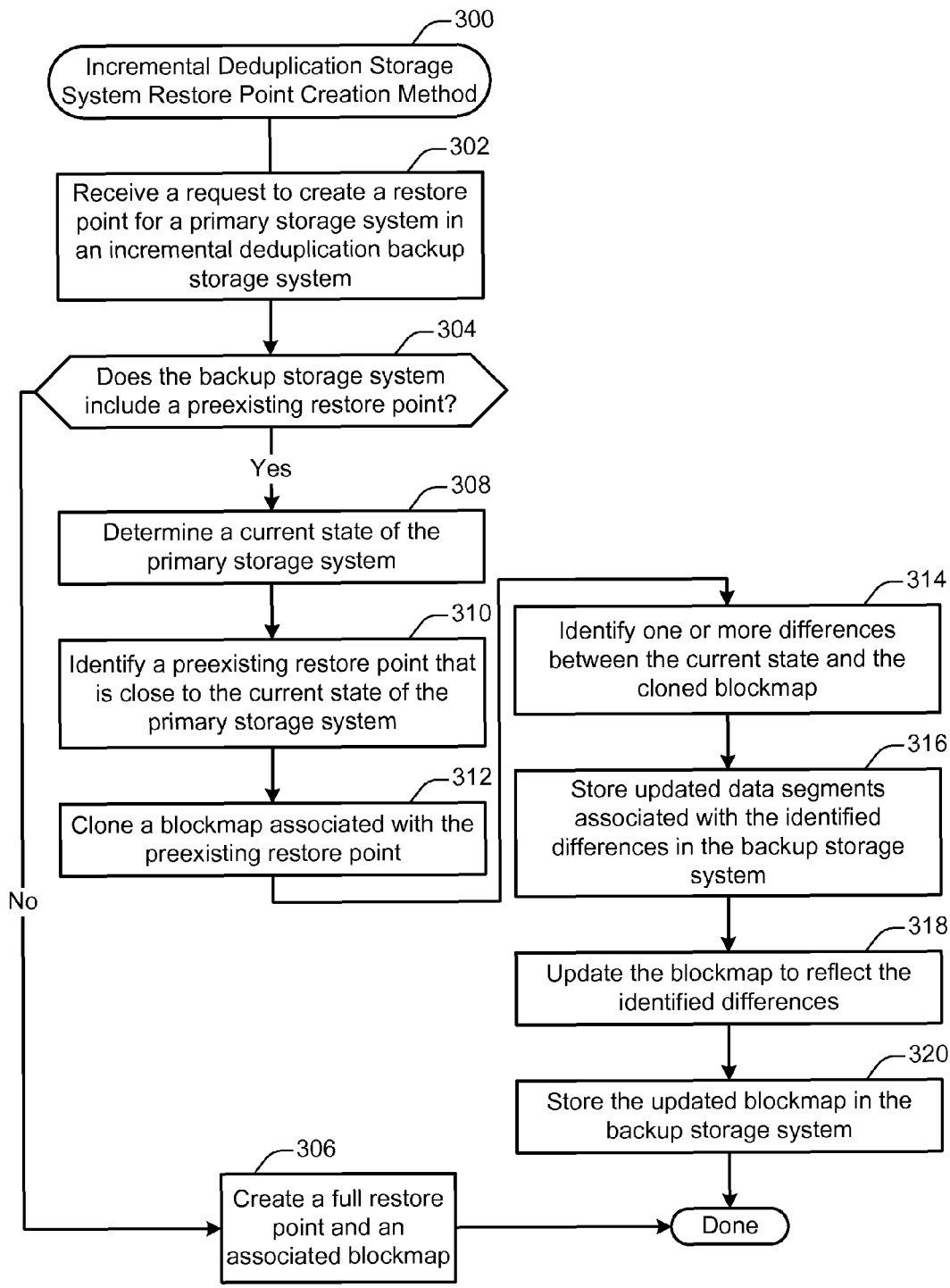
FIG. 3 illustrates a particular example of a method for creating a restore point on a backup storage system.

FIG. 3 illustrates a particular example of a method 300 for creating a restore point on a backup storage system. According to various embodiments, the method 300 may be performed at a computer device configured to control a backup storage system. The method 300 may be used to create a restore point in an efficient manner on a backup storage system that supports data deduplication. The restore point may provide information and instructions for restoring all or a portion of a primary storage system to a particular storage system state.

At 302, a request is received to create a restore point for a primary storage system in an incremental deduplication backup storage system. According to various embodiments, the request may be created based on any of various events. For instance, the request may be created manually by a user or automatically by a program. The primary storage system may be backed up on a scheduled or periodic basis or may be backed up when a triggering event is detected. For example, the primary storage system may be backed up once per day, once per hour, twice per week, or according to some other schedule.

At 304, a determination is made as to whether the backup storage system includes a preexisting restore point. According to various embodiments, the determination may be made by querying the backup storage system itself or a controller associated with the backup storage system.

At 306, when it is determined that the backup storage system does not include a preexisting restore point, then a full restore point and an associated blockmap is created.

According to various embodiments, when no preexisting restore point exists, the new restore point cannot be an incremental restore point. Instead, all of the data needing to be backed up is moved to the backup storage system for storage. Then, a blockmap is created that lists the data segments included in the restore point along with the locations in the backup storage system for retrieving the data segments.

According to various embodiments, once created the full restore point may then be used to create incremental restore points, as discussed with respect to operations 308-320. Alternately, or additionally, the full restore point may be used to restore the primary storage system to the state in which it is in when the method 300 is performed.

At 308, a current state of the primary storage system is determined. According to various embodiments, the current state of the primary storage system may be determined by analyzing the portion of the primary storage system that is to be backed up. The portion of the primary storage system that is to be backed up may include all of the data stored on the primary storage system or only a portion of the data stored there, such as files stored in particular directories or drives on the primary storage system.

According to various embodiments, determining the current state of the primary storage system may involve constructing a list of each data segment stored on the primary storage system. As discussed with respect to FIG. 4, each data segment may be associated with a unique identifier that may be used to distinguish it from other data segments. The list may be constructed by analyzing the organizational structure for the primary storage system. For instance, information characterizing the data segments stored on the primary storage system may be retrieved from a data directory that catalogues such information.

At 310, a preexisting restore point that is close to the current state of the primary storage system is identified. According to various embodiments, the preexisting restore point may be identified by comparing the list of data segments associated with the current state of the primary storage system determined in operation 308 with the lists of data segments included in blockmaps associated with preexisting restore points. Then, a determination may be made as to which preexisting restore point is closest.

According to various embodiments, in many instances, the preexisting restore point closest to the current state of the primary storage system may be the most recent preexisting restore point. However, this need not be the case. For instance, a large block of data may be included in a restore point created in the distant past. Then, the large block of data may be removed from the storage system for a time during which a number of intervening restore points are created. Next, the large block of data may be returned to the primary storage system. In this case, the preexisting restore point closest to the current state of the primary storage system may be the restore point created in the distant past.

According to various embodiments, the closest preexisting restore point may be determined by any of various comparison criteria. These criteria may be strategically determined based on various factors, such as space utilization, backup speed, restore speed, and/or various capabilities of the particular storage systems being used. For instance, one way to select the closest restore point may be to select the preexisting restore point that has the greatest number of data segments included in the current state of the storage system. This technique may have the advantage of reducing the amount of data storage space needed to create the new restore point. However, another way to select the closest preexisting restore point may be to select the preexisting restore point that has the fewest total number of changes relative to the current state of the primary storage system.

At 312, a blockmap associated with the preexisting restore point is cloned. According to various embodiments, cloning the blockmap may involve copying it to a different memory or storage system location so that it can be modified or edited without altering the original blockmap associated with the preexisting restore point. In this way, the preexisting restore point may be maintained as is while at the same time being used as a basis for creating a new, incremental restore point.

At 314, one or more differences between the current state of the primary storage system and the cloned blockmap are identified. According to various embodiments, these differences represent changes to the data stored on the primary storage system that have occurred in the time interval between the creation of the identified preexisting restore point and the determination of the current state of the primary storage system at operation 308.

According to various embodiments, the identified one or more differences may include one or more deletions. Each deletion corresponds to a data segment that was included in the blockmap associated with the preexisting restore point but that is not present in the current state of the primary storage system determined at operation 308.

According to various embodiments, the identified one or more differences may include one or more insertions. Each insertion corresponds to a data segment that was not included in the blockmap associated with the preexisting restore point but that is present in the current state of the primary storage system determined at operation 308.

According to various embodiments, the differences between the current state of the primary storage system and the cloned blockmap may be identified by constructing a list of the data segments that are included in the current state of the primary storage system and comparing that list to the list of data segments included in the cloned blockmap. Each deletion and insertion may be flagged for use in creating the new, incremental restore point.

According to various embodiments, the identification of one or more differences between the current state and the cloned blockmap may be implicit in the generation of an incremental backup and may not be performed explicitly. For instance, when an incremental backup is written to the system, it may result in overwrites to regions contained in the cloned blockmap (or new regions not yet present in the cloned blockmap). At the end of the incremental backup, the cloned blockmap may represent a complete backup without explicitly performing any operation to identify the differences between the current state and the cloned blockmap. In some embodiments, the differences between the current state and the cloned blockmap may be performed as part of the generation of the incremental backup was generated by a backup administrator.

At 316, updated data segments associated with the identified differences in the backup storage system are stored in the backup storage system. According to various embodiments, a data segment associated with a deletion identified at operation 314 need not be stored. That is, if a data segment is present in the cloned blockmap created at operation 312 but is not present in the current state of the primary storage system determined at operation 308, then that data segment may simply be removed from the blockmap in order to modify the blockmap to reflect the deletion.

According to various embodiments, the data segments stored may be those associated with the insertions identified at operation 314. That is, if a data segment is not present in the cloned blockmap created at operation 312 but is present in the current state of the primary storage system determined at operation 308, then that data segment may be stored at a storage location on the backup storage system. Storing the data segment may involve, for instance, copying the data segment from the primary storage system to the backup storage system.

In particular embodiments, storing a data segment in the backup storage system may involve identifying a location in the backup storage system at which the data segment is already stored. For instance, a data segment may already be stored on the backup storage system in association with a different restore point. In particular embodiments.

At 318, the blockmap is updated to reflect the identified differences. According to various embodiments, the blockmap may be updated to reflect any insertions or deletions identified at operation 314. In some instances, updating the blockmap may involve deleting entries from the blockmap. In other instances, updating the blockmap may involve adding new entries to the blockmap.

In particular embodiments, if a data segment is present in the blockmap cloned for the preexisting restore point but is not present in the current state of the primary storage system, then the entry corresponding with the data segment may be deleted from the cloned blockmap. In this way, the data segment will not be included if the restore point is used to restore the primary storage system.

In particular embodiments, if a data segment is not present in the blockmap cloned for the preexisting restore point but is present in the current state of the primary storage system, then an entry corresponding with the data segment may be added to the cloned blockmap. The entry corresponding with the data segment may include an identifier associated with the data segment as well as location information indicating where on the backup storage system the data segment is stored. In this way, the data segment will be included if the restore point is used to restore the primary storage system.

At 320, the updated blockmap is stored in the backup storage system. According to various embodiments, the updated blockmap may be stored in such a way that it can be retrieved for use in restoring the primary storage system to the state identified at operation 308. Techniques for restoring the primary storage system to a state described in a restore point are described in additional detail with respect to FIG. 5.

Figure 4:
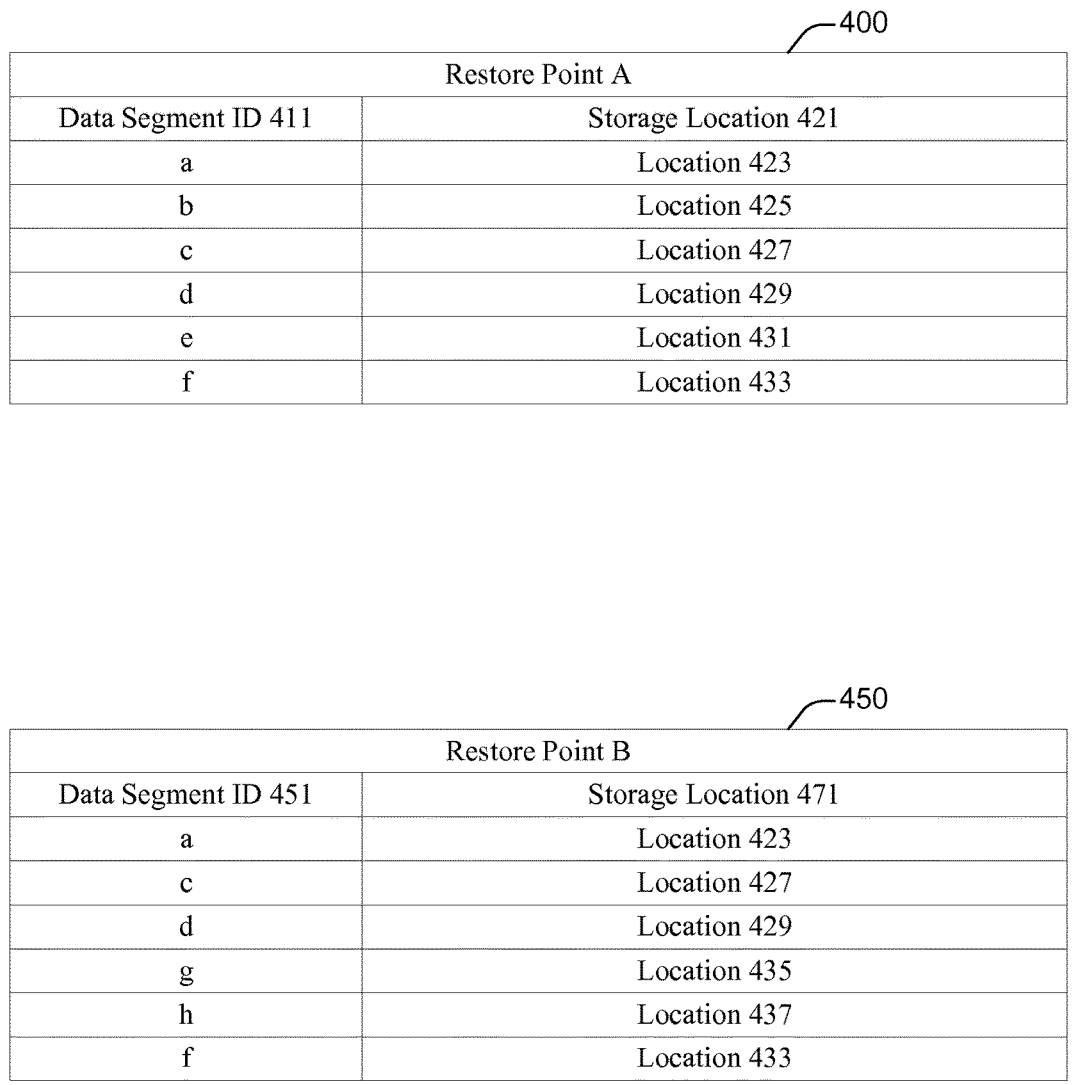
FIG. 4 illustrates a particular example of arrangement of data segment blockmaps on a backup storage system.

FIG. 4 illustrates a particular example of arrangement of data segment blockmaps on a backup storage system. According to various embodiments, the arrangement of blockmaps shown in FIG. 4 may be created in accordance with the techniques discussed herein, for instance with respect to FIG. 3. Specifically, FIG. 4 illustrates a blockmap 450 associated with a restore point B that is incrementally created based on the blockmap 400 associated with the restore point A.

FIG. 4 shows a blockmap for a restore point A 400 and a blockmap for a restore point B 450. The restore point A blockmap 400 includes a list of data segments associated with an identifier included in the data segment identifier column 411. Each data segment is associated with a storage location identified in column 421. Similarly, the restore point B blockmap 450 includes a list of data segments associated with an identifier included in the data segment identifier column 451. Each data segment is associated with a storage location identified in column 471.

According to various embodiments, each of the data segment identifiers may be used to identify a particular data segment included in the restore point. For instance, the restore point A includes data segments associated with identifiers "a" through "f".

According to various embodiments, each data segment identifier may be a unique identification number assigned to a particular data segment. For instance, the data segment identifier may be a 64-bit number that is incremented for each new data segment that is stored on the storage system. However, different storage systems may employ different strategies for assigning and maintaining data segment identifiers.

According to various embodiments, each storage system location corresponds to a location within the backup storage system at which the data segment is stored. Accordingly, each blockmap includes references to the data storage locations at which the data segments are stored rather than the data segments themselves.

In particular embodiments, as discussed with respect to FIG. 3, a reference count for each data segment may be stored in addition to the information shown in FIG. 4. The reference count may indicate the number of times the data segment is referenced in restore points stored on the backup storage system. In this way, a data segment may be deleted when, and only when, it is no longer referenced by any restore point.

According to various embodiments, each successive restore point may include a blockmap that is at least partially cloned from a previously created restore point block map. For instance, the blockmap for restore point B shown in FIG. 4 may be created by cloning the blockmap associated with the previously existing restore point A.

According to various embodiments, a new restore point based on a preexisting restore point may include references to previously stored data segments so that the backup storage system need not receive or store additional copies of these data segments. For instance, both restore point A and restore point B include data segments associated with the identifiers "a", "c", "d", and "f". In both restore points, these data segments are stored on the storage system in locations 423, 425, 429, and 433 respectively. That is, a single copy of each data segment is stored, even though the data segments are included within both restore points.

According to various embodiments, a new restore point based on a preexisting restore point may not include references to previously stored data segments that were part of the previous restore point but that are not part of the new restore point. For instance, in FIG. 4, the blockmap 400 associated with the restore point A includes data segments associated with identifiers "b" and "e" that are stored in storage locations 425 and 431 respectively. However, these data segments are absent from the restore point B blockmap 450.

According to various embodiments, a new restore point based on a preexisting restore point may include new references to data segments that have been added or updated in the time period since the preexisting blockmap was created. For instance, in FIG. 4, the blockmap 450 associated with the restore point B includes data segments associated with identifiers "g" and "h" that are stored in storage locations 435 and 437 respectively. However, these data segments are absent from the restore point A blockmap 400.

In particular embodiments, aside from the cloned blockmap itself, these two new data segments represent the additional data that needs to be stored on the backup storage system in order to create the restore point B. All of the other data segments are available with reference to the storage system locations referenced in the blockmap associated with the preexisting restore point A. However, the restore point B blockmap 400 need not be read or synthesized in order to restore the primary storage system to the state associated with the restore point B.

In particular embodiments, restore points having blockmaps with various numbers of data segments may be stored on a backup storage system. The blockmaps shown in FIG. 4 are presented for the purpose of illustration and explanation. Typically, a restore point will include may more data segments than shown in FIG. 4.

Figure 5:
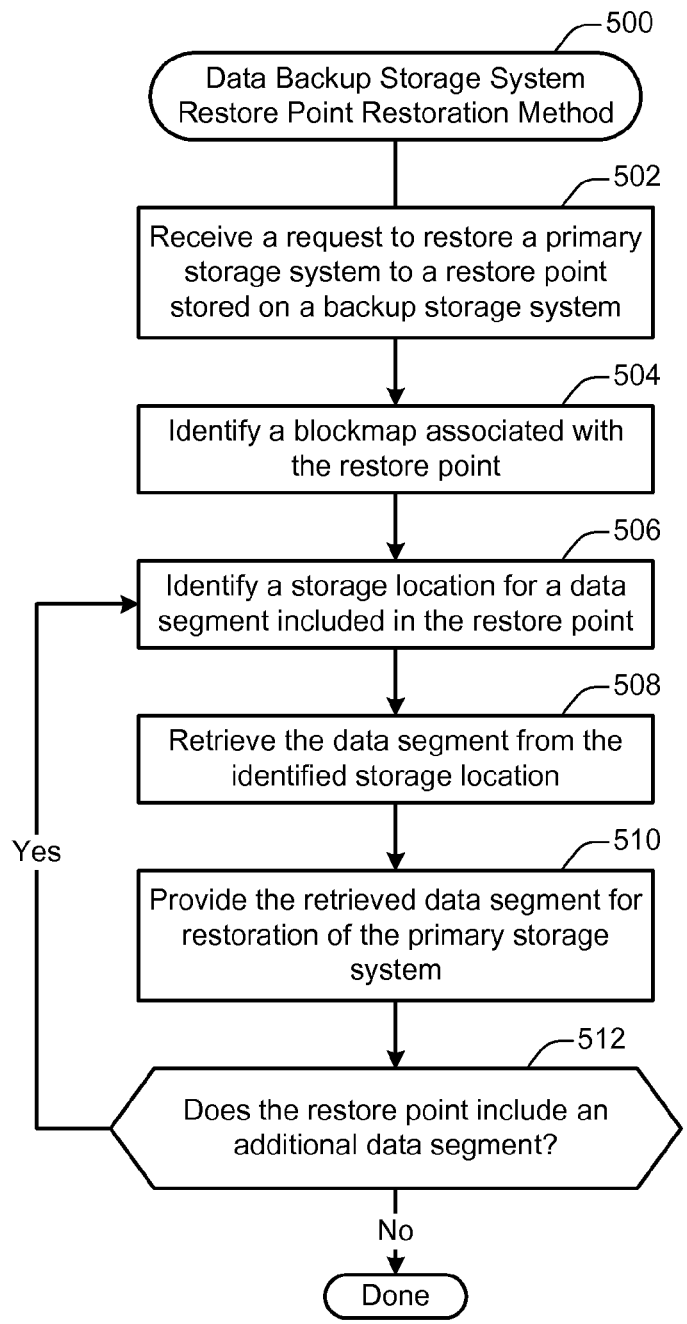
FIG. 5 illustrates a particular example of a method for restoring a restore point stored on a backup storage system.

FIG. 5 illustrates a particular example of a method 500 for restoring a restore point stored on a backup storage system. According to various embodiments, the method 500 may be performed at a computing device configured to communicate with a primary storage system and an incremental deduplication storage system. The incremental deduplication storage system may be configured to store one or more restore points for restoring the data stored on the primary storage system to an earlier state.

According to various embodiments, a primary storage system may need to be restored to a state associated with a restore point for any of various reasons. For example, a storage device associated with the primary storage system may have suffered a failure condition in which data was lost. As another example, two storage devices that are acting in a mirrored storage arrangement may have become out-of-sync. As yet another example, a user or process may have inadvertently deleted data that later needs to be recovered.

At 502, a request to restore a primary storage system to a restore point stored on a backup storage system is retrieved. According to various embodiments, the request may be received in any of various contexts. For example, the request may be generated manually by a user or automatically by a process. As another example, the restore point may be used to restore the storage system from which the restore point was created or may be used to place a different storage system in the state associated with the restore point.

At 504, a blockmap associated with the restore point is identified. According to various embodiments, the blockmap may be identified by transmitting a request to the incremental backup storage system or a controller associated with the incremental backup storage system. Examples of the types of blockmaps that may be retrieved are shown in FIG. 4.

At 506, a storage location for a data segment included in the restore point is identified. According to various embodiments, the storage location may be identified by reading the blockmap associated with the restore point. As shown in FIG. 4, the blockmap may indicate a storage location associated with each data segment included in the restore point.

At 508, the data segment is retrieved from the identified storage system. According to various embodiments, retrieving the data segment may involve transmitting an instruction to a storage device to read the location indicated in the blockmap. As discussed herein, the storage device may be any computing device configured to store data, such as a magnetic disk drive, a tape drive, or an optical drive.

At 510, the retrieved data segment is provided for restoration of the primary storage system. According to various embodiments, the way in which the retrieved data segment is provided to the primary storage system may depend on the configuration of the two storage systems. For example, the retrieved data segment may be transmitted directly to the primary storage system. As another example, the retrieved data segment may be stored in a buffer prior to transmission. As yet another example, the retrieved data segment may be transmitted to a controller or other computing device configured to control the primary storage system.

At 512, a determination is made as to whether the restore point includes an additional restore point. According to various embodiments, if the restore point is being restored in its entirety, then each data segment included in the blockmap associated with the restore point may be retrieved for restoration. The determination as to whether the restore point includes an additional data segment may be made by analyzing the blockmap to determine if any unrestored data segments remain.

Figure 6:
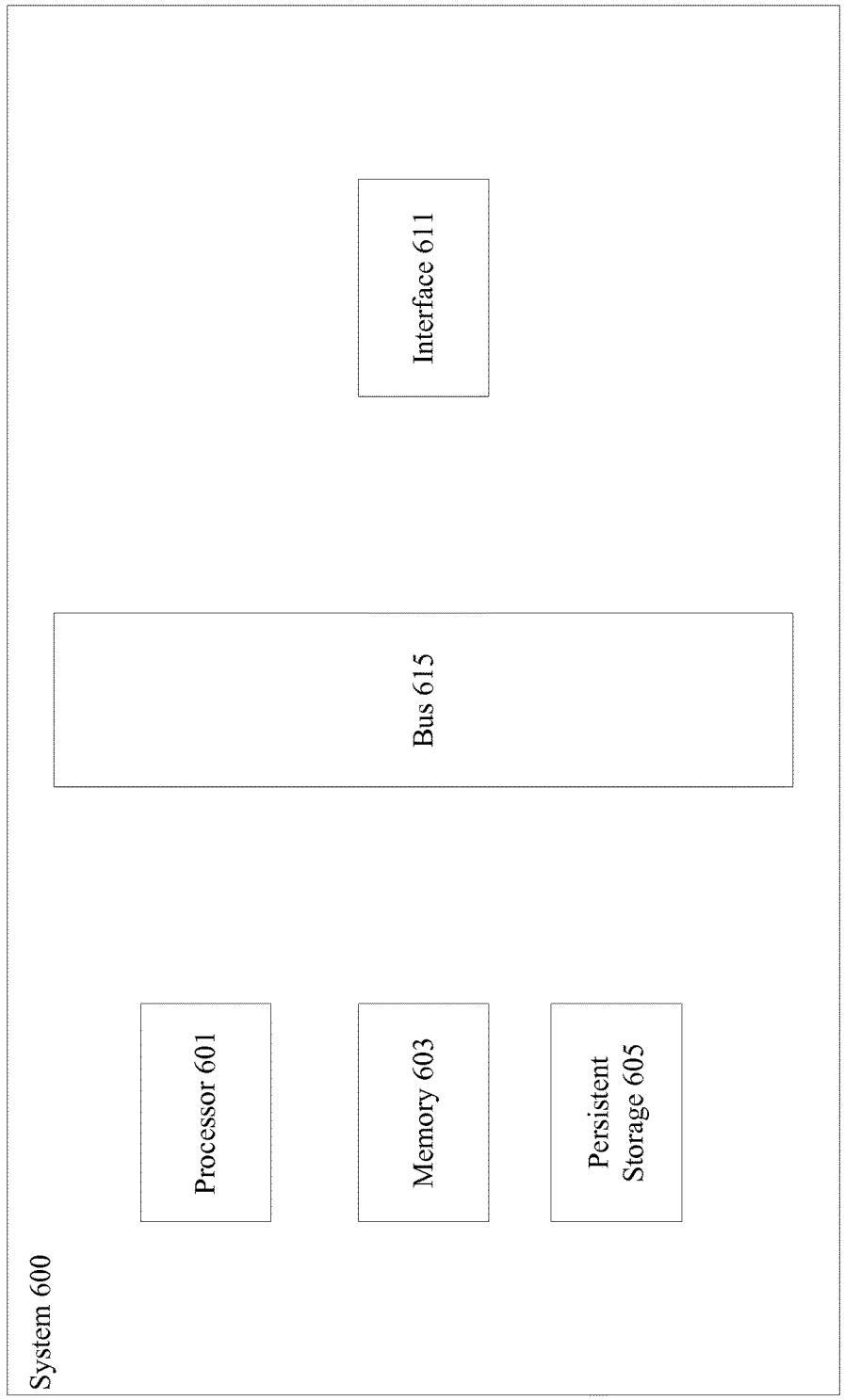
FIG. 6 illustrates a particular example of a method for system.

A variety of devices and applications can implement particular examples of the present invention. FIG. 6 illustrates one example of a system that can be used as a storage node in a deduplication system. According to particular example embodiments, a system 600 suitable for implementing particular embodiments of the present invention includes a processor 601, a memory 603, an interface 611, persistent storage 605, and a bus 615 (e.g., a PCI bus). When acting under the control of appropriate software or firmware, the processor 601 is responsible for such tasks such as optimization. Various specially configured devices can also be used in place of a processor 601 or in addition to processor 601. The complete implementation can also be done in custom hardware. The interface 611 is typically configured to send and receive data packets or data segments over a network. Particular examples of interfaces the device supports include Ethernet interfaces, frame relay interfaces, cable interfaces, DSL interfaces, token ring interfaces, and the like. Persistent storage 605 may include disks, disk arrays, tape devices, solid state storage, etc.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 600 uses memory 603 to store data and program instructions and maintain a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method comprising:
    comparing a designated primary storage system state to a plurality of blockmaps in a backup storage system, the designated primary storage system state identifying a designated plurality of data segments stored at a primary storage system, each blockmap corresponding with a respective restore point, each blockmap identifying a respective plurality of data segments, each data segment having associated therewith a respective storage location in the backup storage system;
    selecting a first blockmap identifying a first plurality of data segments from the plurality of blockmaps based on a number of segments shared between the designated plurality of data segments and the first plurality of data segments, the first blockmap corresponding with a first restore point;
    comparing the first blockmap with the designated primary storage system state to identify:
        a subset of the first plurality of data segments that each correspond with a respective matching data segment in the designated plurality of data segments, and
        a second plurality of data segments associated with the designated primary storage system state, the second plurality of data segments not being included in the first blockmap, each of the second plurality of data segments having associated therewith a respective storage location in the backup storage system;
    creating a second restore point by storing a second blockmap in the backup storage system, the second blockmap including both the identified subset of the first plurality of data segments and the second plurality of data segments, the second blockmap indicating how to restore the primary storage system to the designated primary storage system state; and
    providing the second restore point for selection for restoring the designated primary storage system to the designated primary storage system state.

2. The method recited in claim 1, the method further comprising:
    storing the second plurality of data segments in the backup storage system.

3. The method recited in claim 1, wherein the first blockmap includes location information identifying the respective storage location associated with each of the first plurality of data segments.

4. The method recited in claim 3, the method further comprising:
    retrieving the identified subset of the first plurality of data segments from the backup storage system based on the location information.

5. The method recited in claim 4, the method further comprising:
    transmitting the identified subset of the first plurality of data segments to a primary storage system for restoring the primary storage system to the designated primary storage system state.

6. The method recited in claim 1, wherein the designated primary storage system state includes data configuration information that describes a configuration of data on a primary storage system, the backup storage system being configured to back up the data stored on the primary storage system.

7. A system comprising:
a storage module configured to store a plurality of blockmaps, each blockmap corresponding with a respective restore point, each blockmap identifying a respective plurality of data segments, each data segment having associated therewith a respective storage location in the storage module; and
a processor configured to:
compare a designated primary storage system state to the plurality of blockmaps, the designated primary storage system state identifying a designated plurality of data segments stored at a primary storage system,
select a first blockmap identifying a first plurality of data segments from the plurality of blockmaps based on a number of segments shared between the designated plurality of data segments and the first plurality of data segments, the first blockmap corresponding with a first restore point,
compare the first blockmap with the designated storage system state to identify a subset of the first plurality of data segments that each correspond with a respective matching data segment in the designated plurality of data segments and a second plurality of data segments associated with the designated primary storage system state, the second plurality of data segments not being included in the first blockmap, each of the second plurality of data segments having associated therewith a respective storage location in the backup storage system,
create a second restore point by store a second blockmap in the backup storage system, the second blockmap including both the identified subset of the first plurality of data segments and the second plurality of data segments, the second blockmap indicating how to restore the primary storage system to the designated primary storage system state, and
provide the second restore point for selection for restoring the designated primary storage system to the designated primary storage system state.

8. The system recited in claim 7, wherein the processor is further configured to:
store the second plurality of data segments in the storage module.

9. The system recited in claim 7, wherein the first blockmap includes location information identifying the respective storage location associated with each of the first plurality of data segments.

10. The system recited in claim 9, wherein the processor is further configured to:
retrieve the identified subset of the first plurality of data segments from the backup storage system based on the location information.

11. The system recited in claim 9, the system further comprising:
a communications module configured to transmit the identified subset of the first plurality of data segments to a primary storage system for restoring the primary storage system to the designated primary storage system state.

12. One or more non-transitory computer readable media having instructions stored thereon for performing a method, the method comprising:
comparing a designated primary storage system state to a plurality of blockmaps in a backup storage system, the designated primary storage system state identifying a designated plurality of data segments stored at a primary storage system, each blockmap corresponding with a respective restore point, each blockmap identifying a respective plurality of data segments, each data segment having associated therewith a respective storage location in the backup storage system;
selecting a first blockmap identifying a first plurality of data segments from the plurality of blockmaps based on a number of segments shared between the designated plurality of data segments and the first plurality of data segments, the first blockmap corresponding with a first restore point;
comparing the first blockmap with the designated primary storage system state to identify:
a subset of the first plurality of data segments that each correspond with a respective matching data segment in the designated plurality of data segments, and
a second plurality of data segments associated with the designated primary storage system state, the second plurality of data segments not being included in the first blockmap, each of the second plurality of data segments having associated therewith a respective storage location in the backup storage system;
creating a second restore point by storing a second blockmap in the backup storage system, the second blockmap including both the identified subset of the first plurality of data segments and the second plurality of data segments, the second blockmap indicating how to restore the primary storage system to the designated primary storage system state; and
providing the second restore point for selection for restoring the designated primary storage system to the designated primary storage system state.

* * * * *